J. D. VIRUETTE.
NUT LOCK AND SWAB.
APPLICATION FILED APR. 6, 1916.
1,195,753.
Patented Aug. 22, 1916.
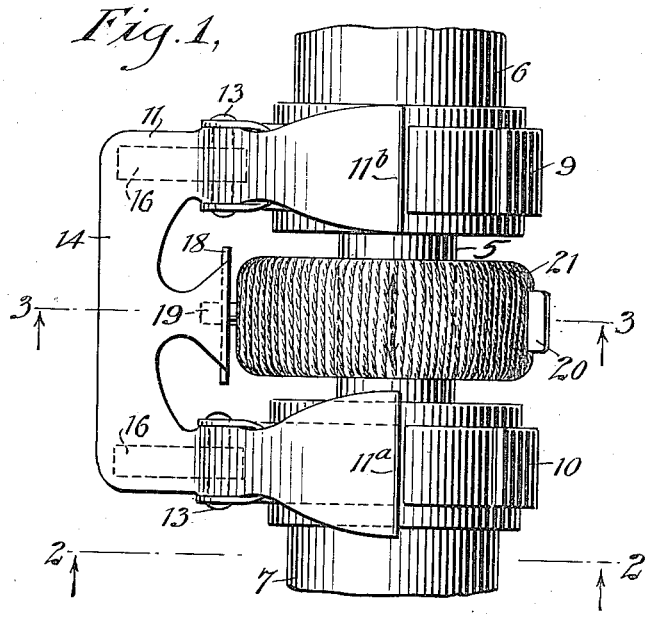
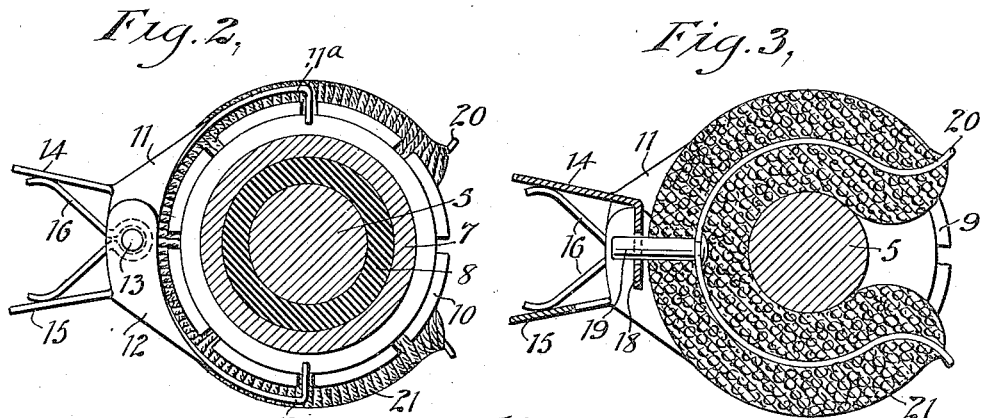
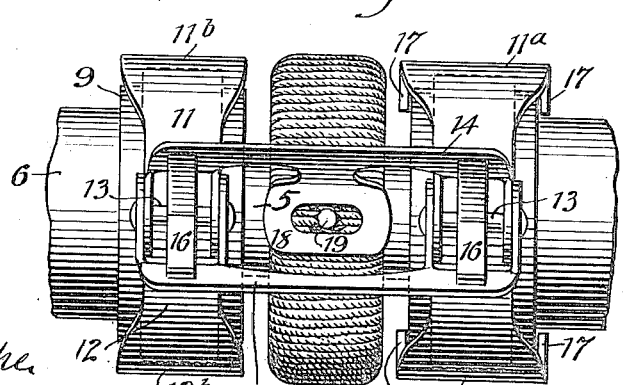
WITNESSES
Edw. Thorpe
J. E. Larsen
INVENTOR
J. D. Viruette
BY
ATTORNEYS

UNITED STATES PATENT OFFICE.

JOSEPH D. VIRUETTE, OF ONEONTA, NEW YORK.

NUT-LOCK AND SWAB.

1,195,753.  Specification of Letters Patent.  Patented Aug. 22, 1916.

Application filed April 6, 1916. Serial No. 89,412.

*To all whom it may concern:*

Be it known that I, JOSEPH D. VIRUETTE, a citizen of the United States, and a resident of Oneonta, in the county of Otsego and State of New York, have invented certain new and useful Improvements in Nut-Locks and Swabs, of which the following is a specification.

My invention relates to the piston rods of air compressors, and the main object thereof is to provide a lock for the nuts on such rods whereby the packings of the said air compressors are held against leakage.

My invention also contemplates the provision of a swab on the piston rod and means on the nut lock for maintaining said swab in position.

My invention is fully described in the following specification, of which the accompanying drawings form a part, in which like characters refer to like parts in each of the views, and in which:—

Figure 1 is a fragmentary side view of a piston rod of an air compressor with my invention in operative position; Fig. 2 is a section taken on the line 2—2 of Fig. 1; Fig. 3 is a section taken on the line 3—3 of Fig. 1; and Fig. 4 is a view similar to Fig. 1 taken from the left hand side of Fig. 1.

Referring to the drawings, 5 represents a piston rod slidably mounted within the glands 6 and 7, a packing 8 being held within said glands by means of nuts 9 and 10, these nuts having longitudinally arranged slots in the peripheries whereby they may be set up by means of a spanner wrench or the like. The nuts are locked in place by means of a double clamp consisting of two plates 11 and 12 in pivotal connection at 13 and provided with handle members 14 and 15 outside of the pivots and jaws 11ª and 11ᵇ for the plate 11 and 12ª and 12ᵇ for the plate 12. Each of these jaws has an inwardly directed end adapted to enter one of the slots in one of the nuts and this nut engagement is maintained by means of a spring 16 which holds the handle members 14 and 15 apart. The jaws 11ª and 12ª are shown as being provided with fingers 17 extending inwardly over the ends of the nut 10 and tending to prevent movement of the nut lock longitudinally of the nuts, these jaws being wider than the nut 10 whereas the jaws 11ᵇ and 12ᵇ are of a width approximating the length of the nut 9, but I may make all the jaws alike if desired. The plate 11 has a slotted member 18 formed thereon centrally thereof and extending between the two plates, this member being for the purpose of holding a rod 19 secured to a spring clip 20 having oil absorbing material thereon, as at 21, to serve as a swab for the piston rod 5 in the reciprocation of the latter, and this swab may be readily removed from the piston rod because of the spring clip 20. In practice, the nuts are set up in such manner as to bring the surface slots in the nuts into line approximately, after which the handle members 14 and 15 are forced together to permit the jaws 11ª and 12ª to engage in oppositely located slots in the nut 10 and to permit the jaws 11ᵇ and 12ᵇ to engage oppositely located slots in the nut 9, thereby preventing rotary movement of either nut with respect to the other.

My invention is very simple, though highly efficient, is quickly snapped into place and as readily removed, and also serves as the holding means for the swab 21, and, while I have shown a preferred form of construction, it will be obvious that I may make changes thereover provided such changes come within the spirit of the invention and within the scope of the appended claims.

Having fully described my invention, what I claim as new, and desire to secure by Letters Patent, is:—

1. The combination with a reciprocating piston rod and stationary packing glands, of a nut on each gland, and a clamp consisting of two pivoted plates provided with two sets of jaws and means for holding each set of jaws in engagement with one of said nuts to prevent movement of the latter.

2. The combination with a reciprocating piston rod, stationary packing glands, and a grooved nut on each gland; of a clamp consisting of two pivotally connected plates having inwardly turned jaws engaged with the grooves of the respective nuts, a spring for maintaining said jaws in nut engaging position, a slotted member on one of said plates, a rod engaged in said slot, a spring clip secured to said rod and encircling said piston rod, and absorbent material carried by said clip to serve as a swab for said piston rod.

JOSEPH D. VIRUETTE.

Witnesses:
 LEIGH MURDOCK,
 LAURENS J. EGGLESTON.